(12) United States Patent
Ledingham

(10) Patent No.: US 6,872,027 B2
(45) Date of Patent: *Mar. 29, 2005

(54) VERSATILE GUIDE RAIL CLAMP

(75) Inventor: Stuart J. Ledingham, Coto De Caza, CA (US)

(73) Assignee: Valu Engineering, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/647,486

(22) Filed: Aug. 25, 2003

(65) Prior Publication Data

US 2004/0037639 A1 Feb. 26, 2004

Related U.S. Application Data

(63) Continuation of application No. 08/871,300, filed on Jun. 9, 1997, now Pat. No. 6,685,385, which is a continuation of application No. 08/540,016, filed on Oct. 6, 1995, now abandoned.

(51) Int. Cl.[7] .................................................. E04G 7/00
(52) U.S. Cl. ..................... 403/400; 403/396; 403/389; 403/205; 403/403; 403/373; 403/362; 248/68.1
(58) Field of Search .................................. 403/187, 188, 403/205, 345, 346, 362, 373, 389, 382–385, 391, 396, 398–400, 403, 3, 4; 198/836.1, 836.3; 248/68.1, 539, 513

(56) References Cited

U.S. PATENT DOCUMENTS

| | | | |
|---|---|---|---|
| 1,241,126 A | | 9/1917 | Kidd |
| 3,295,871 A | | 1/1967 | Naimer |
| 3,325,227 A | * | 6/1967 | Hunter ........................ 403/395 |
| 3,550,969 A | * | 12/1970 | Robinson ........................ 403/8 |
| 3,827,815 A | * | 8/1974 | Strange ........................ 403/397 |
| 3,847,495 A | | 11/1974 | Peter et al. |
| 4,007,993 A | | 2/1977 | Schwartz |
| 4,919,379 A | | 4/1990 | Goetz |
| 5,163,652 A | | 11/1992 | King |
| 5,184,911 A | | 2/1993 | Wu |
| D340,564 S | | 10/1993 | Ledingham |
| 5,352,078 A | | 10/1994 | Nasu |
| 5,498,264 A | | 3/1996 | Schlapfer et al. |
| 5,609,436 A | | 3/1997 | Jou |
| 5,618,128 A | | 4/1997 | Chen |
| 5,664,902 A | | 9/1997 | Holdsworth |
| 5,762,436 A | | 6/1998 | Mosdal |
| 5,776,006 A | | 7/1998 | Gruber |
| 5,785,571 A | | 7/1998 | Camp |
| 6,685,385 B1 | * | 2/2004 | Ledingham ................. 403/400 |

FOREIGN PATENT DOCUMENTS

| | | |
|---|---|---|
| BE | 520336 | 1/1953 |
| GB | 682916 | 11/1952 |

* cited by examiner

Primary Examiner—Daniel P. Stodola
Assistant Examiner—Michael P. Ferguson
(74) Attorney, Agent, or Firm—Knobbe, Martens, Olson & Bear, LLP

(57) ABSTRACT

A guide rail clamp comprises a first clamp half and a second clamp half, which when fastened together form a slot therethrough adapted to fit a cylindrical support rod or a flat rectangular support bar. The two halves of the clamp may be held together by a pair of bolts extending through a pair of threaded sleeved nuts, which securely grip the bolts when the two clamp halves are spaced slightly apart. In a preferred embodiment, two pegs extending from one clamp half into holes located in the second half help align and secure the grip of the clamp and minimize motion of the rail. To securely fasten the support rod or support bar inserted within the slot, a bolt may be used to bias the support bar or rod against the edges of the slot.

15 Claims, 5 Drawing Sheets

VERSATILE GUIDE RAIL CLAMP

CROSS-REFERENCE TO RELATED APPLICATIONS

This application is a continuation of U.S. patent application Ser. No. 08/871,300, filed on Jun. 9, 1997, now U.S. Pat. No. 6,685,385 which is a file wrapper continuation of U.S. patent application Ser. No. 08/540,016, filed on Oct. 6, 1995 now abandoned. The entire contents of the above applications are incorporated herein by reference and made part of the present disclosure.

BACKGROUND OF THE INVENTION

1. Field of the Invention

The present invention relates to rail clamps used to support and maintain the position of rails used to guide objects down a predetermined path. The versatile rail guide clamp is particularly useful in manufacturing systems, such as assembly line and conveyor belt systems.

2. Description of the Related Art

Guide rails are commonly used in conveyor systems to guide objects down a predetermined path. The rails prevent the objects from moving laterally off a track or belt. It is common practice to use clamps to position and support the guide rails. Guide rail support assemblies in current use have a number of disadvantages. For example, one-piece clamps must be manufactured out of a flexible material which often does not provide adequate support for the guide rail. Due to the flexible material utilized to manufacture the unitary clamp, a guide rail may not be securely held by the clamp, allowing the rail to undesirably pivot within the grip of the clamp.

Another currently available guide rail clamp consists of separate top and bottom clamp halves, fastened together by a pair of bolts. Such guide rail clamp devices have a main rectangular bore extending therethrough in orthogonal relation to the axis of the clamp grips. The rectangular bore is adapted to receive a flat support bar. The height of the clamp may be adjusted by sliding the clamp relative to the flat, rectangular support bar. This prior art clamp, however, is limited to receiving only flat support bars, and is not capable of receiving cylindrical support rods. Thus, these prior art rail clamps can not be used in conjunction with cross-blocks or in other applications where cylindrical support rods are used.

A guide rail clamp for gripping and supporting a guide rail that is easy to use and can accommodate a variety of support bar shapes would be of great benefit.

SUMMARY OF THE INVENTION

In accordance with one aspect of the present invention, there is provided a guide rail clamp for gripping and supporting a guide rail. The clamp comprises a first clamp half, a second clamp half, first fastening means to securely fasten the two clamp halves and second fastening means to secure the clamp to a support bar or rod. The first clamp half has a pair of notches. The second clamp half has a pair of wedges or pegs adapted to be inserted into the notches in the first clamp half to assist in securing and aligning the clamp halves.

The first clamp half has a rectangular slot running through its transverse axis. The shape of the rectangular slot is modified by a cylindrical hole intersecting the rectangular slot. The diameter of the cylindrical hole is larger than the width of the rectangular slot, but smaller than the length of the rectangular slot. The second clamp half of the present invention also has a transverse slot with similar dimensions to the slot in the first clamp half. The two slots are in alignment when the first clamp half is fastened to the second clamp half.

In the preferred embodiment, the first and second clamp halves further comprise a first hole extending therethrough and a second hole extending therethrough. The first fastening means comprise first and second bolts and first and second threaded nuts where the first and second bolts are inserted through the first and second holes and fastened to the first and second nuts, respectively. Alternatively, the fastening means comprise a pair of screws.

Preferably, the first and second clamp halves are formed of material such as polyamide, polyethylene, acetal or any other plastic.

In accordance with another aspect of the present invention, there is provided a method for gripping and supporting a guide rail. The first clamp half and second clamp half are aligned. The wedges or pegs on the second clamp half are inserted into the notches in the first clamp half, and the first and second clamp halves are secured together, such that a guide rail is secured between the first and second clamp halves. The two clamp halves may be attached either before or after insertion of the guide rail.

To mount and support the clamp and corresponding guide rail, a flat support bar, cylindrical support rod, or semi-cylindrical support bar is inserted through the slot of the clamp that is adapted to receive a variety of support bars. In addition, a bar or rod may be replaced with another bar or rod with a different cross-sectional configuration. A threaded bore intersecting the slot is preferably provided. The threaded bore is adapted to receive a threaded bolt which may be adjusted to bias and secure the clamp with respect to the support bar or rod.

DETAILED DESCRIPTION OF THE PREFERRED EMBODIMENTS

Figure 1:
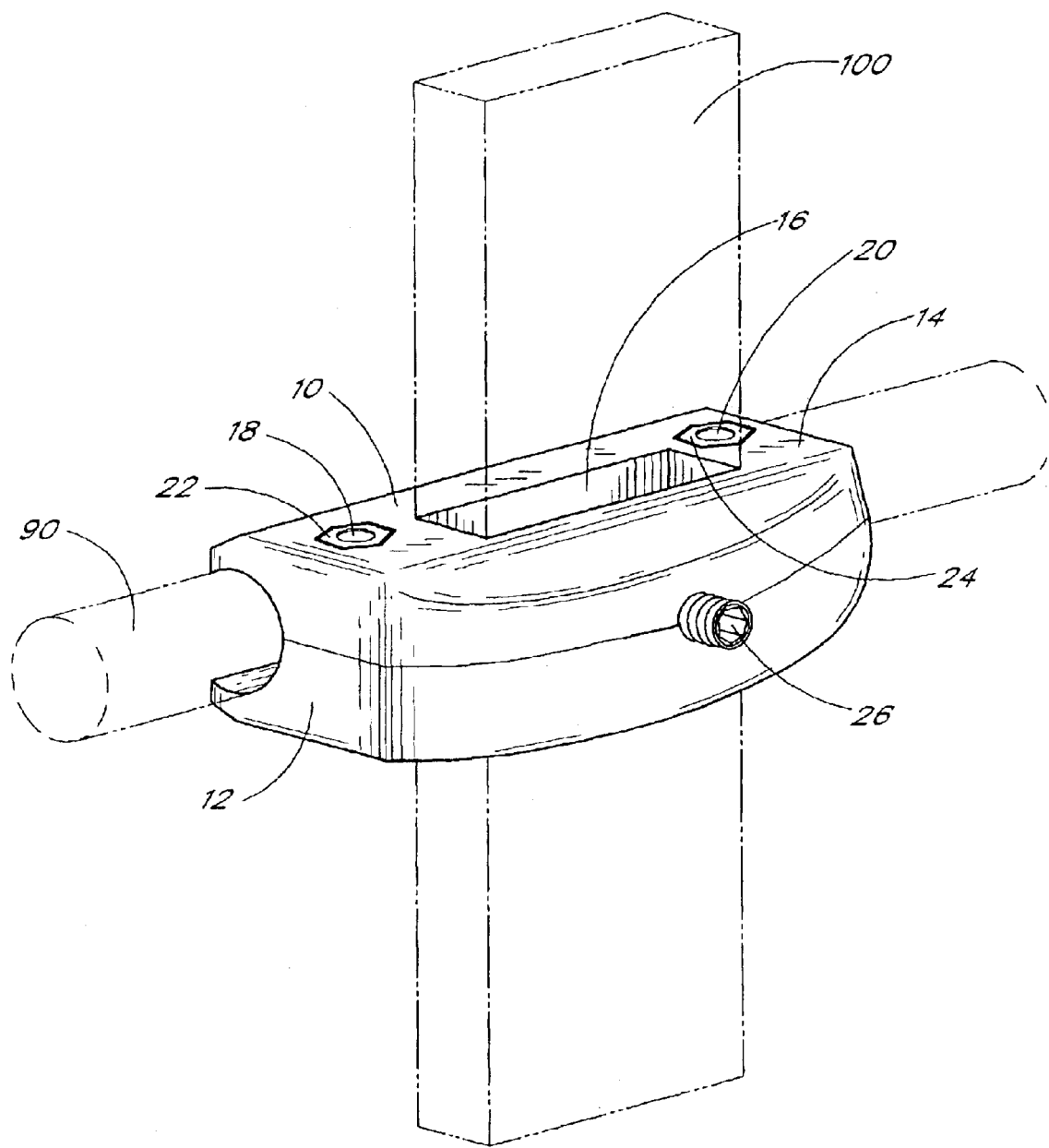
FIG. 1 is a perspective view illustrating a prior art guide rail clamp.

FIG. 1 illustrates a prior art guide rail clamp 10 having a first clamp half 12 and a second clamp half 14 designed to grip guide rail 90. Extending through clamp halves 12 and 14 is rectangular slot 16 for receiving a rectangular, flat support bar 100 to support and position clamp 10 and corresponding guide rail 90. Clamp halves 12 and 14 are fastened together by a pair of bolts 18 and 20 extending through holes on either side of rectangular slot 16 and fastened to corresponding nuts 22 and 24. A third bolt 26 extends transversely into rectangular slot 16 in order to bias and secure the clamp 10 with respect to the flat support bar 100.

As shown in FIG. 1, rail clamp 10 suffers from the limitation of cooperating only with flat rectangular support bars. There are several applications where it is desirable and preferable to secure rail clamp 10 to a cylindrical support rod such as those typically found in connection with cross-blocks. Prior art clamp 10 cannot be used in such applications.

Figure 2:
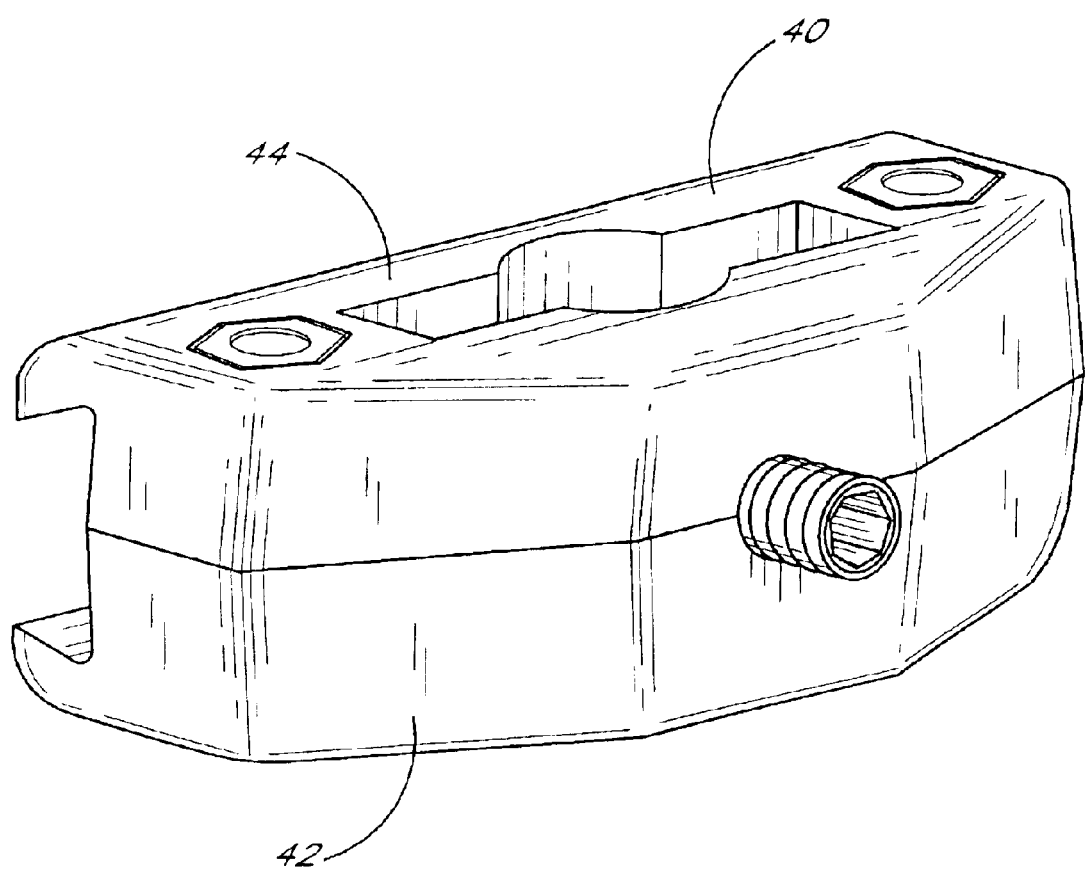
FIG. 2 is a perspective view illustrating the guide rail clamp of the present invention.

FIG. 2 illustrates one preferred embodiment of the clamp 40 of the present invention. The clamp comprises a first clamp half 42, and a second clamp half 44 adapted to be removably secured to first clamp half 42. The guide rail clamp 40 is preferably formed of a synthetic material such as polyamide, polyethylene, acetal, or another plastic, but can also be formed of metal or other suitable materials, as will be readily understood by those with skill in the art.

Figure 4:
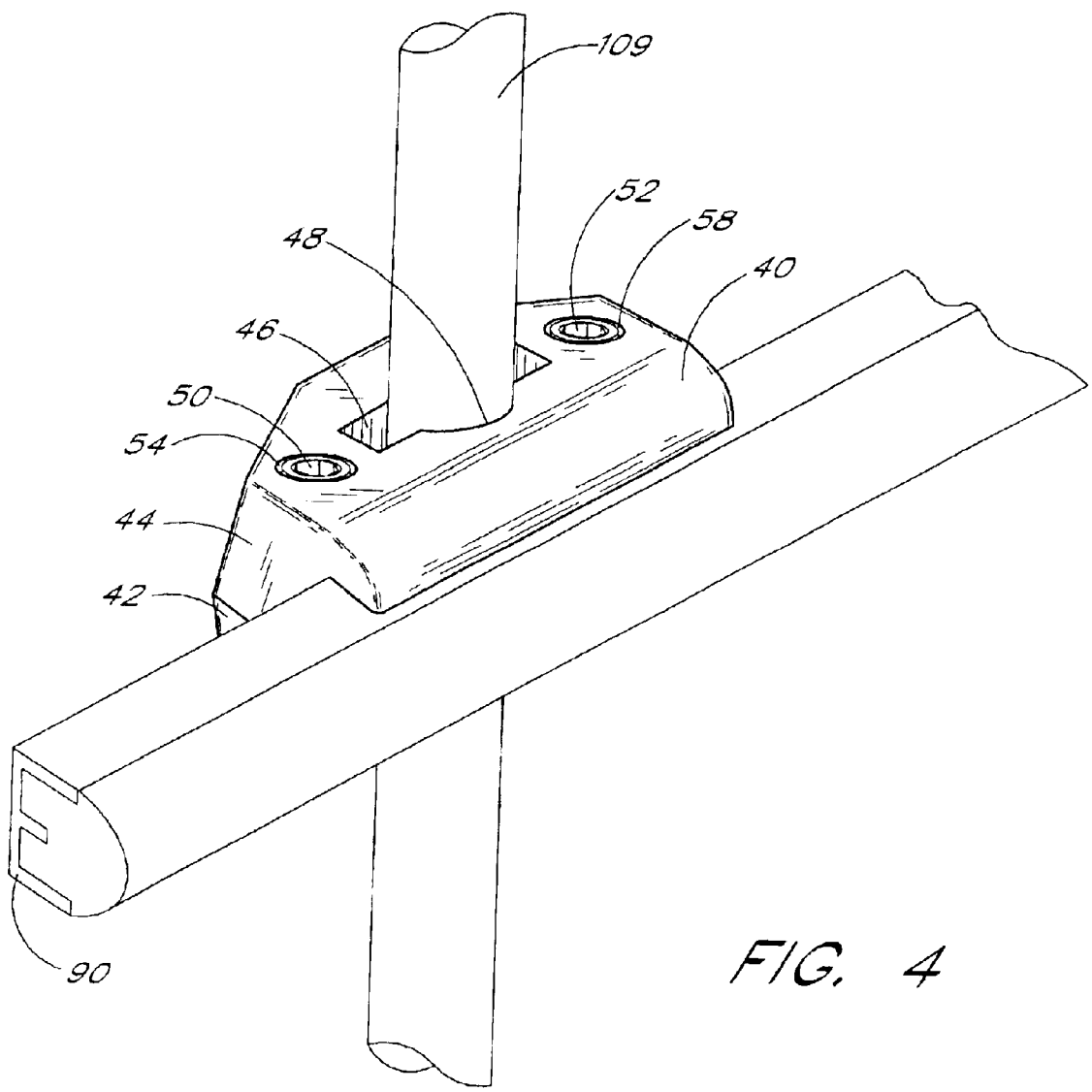
FIG. 4 is a perspective view of the guide rail clamp of FIG. 2, shown in connection with a guide rail.

As shown in FIG. 4, the clamp halves 42 and 44 are designed to grip a guide rail 90. Generally, guide rail 90 will be wider at its base, and the clamp halves 42 and 44 are designed to accommodate the wider portion of the rail and prevent movement of the rail within clamp halves 42 and 44 when the clamp halves 42, 44 are secured. Of course, the clamp the present invention may be adapted to secure guide rails of any cross-sectional configuration. For example, the guide rail may be cylindrical. Also shown in FIG. 4 is slot 46 extending through clamp halves 42 and 44, and having a cylindrical slot section 48. Not only can slot 46 receive a rectangular support bar, but cylindrical slot section 48 of slot 46 is able to accommodate a cylindrical support rod 109 as well.

Figure 3:
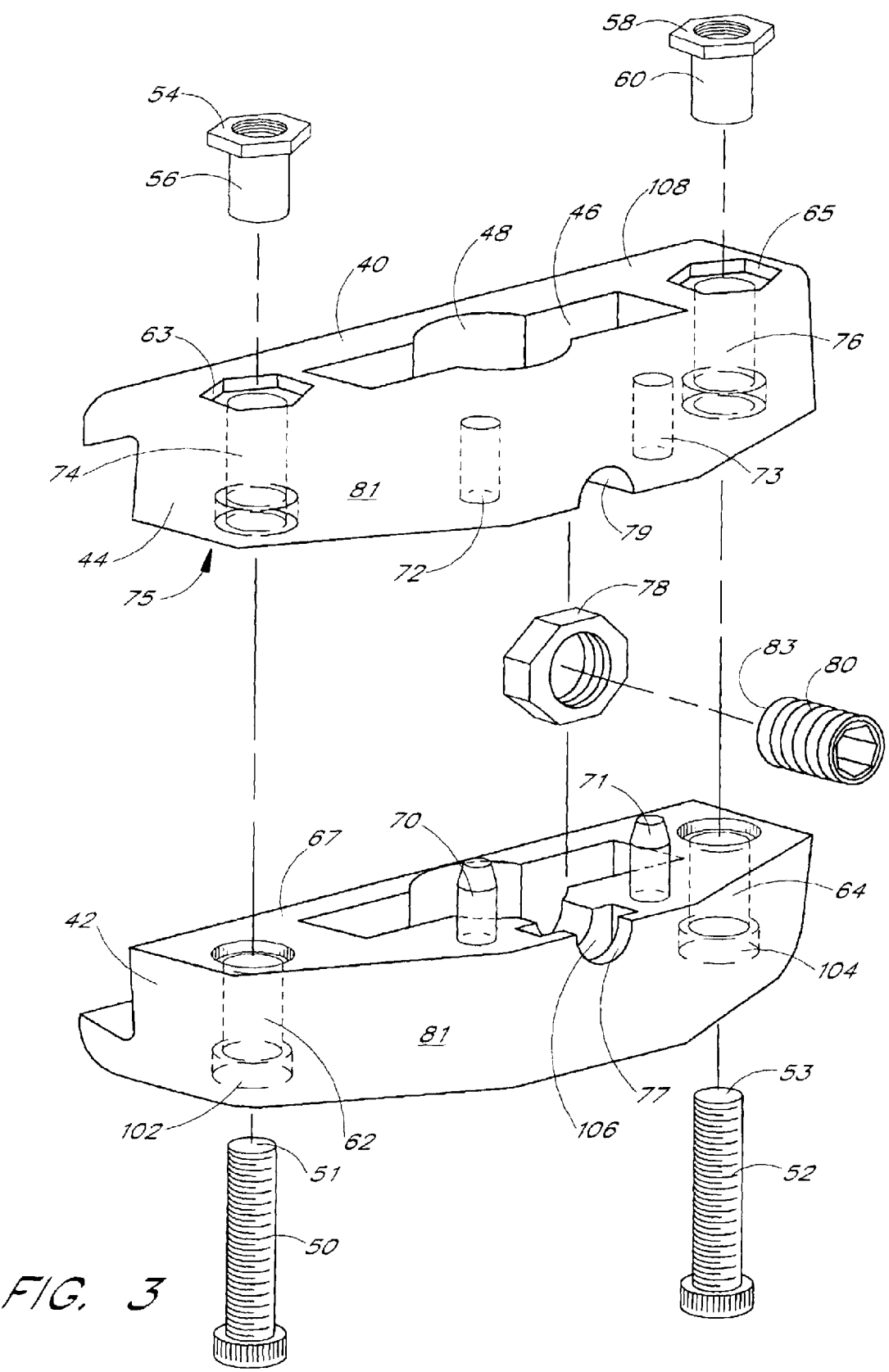
FIG. 3 is an exploded perspective view of the guide rail clamp of the present invention, illustrating each of the components separately.

Referring to FIG. 3, second clamp half 44 is adapted to be interlocking with first clamp half 42. The two halves 42 and 44 are fastened together by a fastening means, such as a screw or a nut and bolt. In the illustrated embodiment, the fastening means comprises first nut 54 and first bolt 50 and second nut 58 and second bolt 52. The nuts 54 and 58 are preferably formed of a nickel-plated brass. Bolts 50 and 52 are preferably formed of stainless steel, although other metals and suitable materials can also be used for both nuts 54 and 58 and bolts 50 and 52. Preferably, nuts 54 and 58 are secured within second clamp half 44 through an interference fit, such that the nuts 54 and 58 may not slide with respect to the clamp half 44. Alternatively, the holes 74 and 76 of the clamp half 44 which receive the nuts 54 and 58 may be manufactured with a lip or ledge (not shown) that partially extends over or covers the holes 74 and 76 on the surface of clamp half 44 to secure the nuts 54 and 58 within the holes 74 and 76 of the clamp half 44. In fact, if the nuts 54, 58 are molded into the clamp half 44, the holes 74, 76 would not need to extend through the clamp half 44. That is, the top surface of the clamp half 44 would be smooth or flush as will be easily understood by those of skill in the art. The bolts 50 and 52 secure the two clamp halves 42 and 44 together by engaging the nuts 54 and 58, respectively. Preferably, the nuts 54 and 58 each have an integral threaded sleeve 56 and 60, respectively, as seen in FIG. 3. The threaded sleeves 56 and 60 enable the bolts 50 and 52 to engage the nuts 54 and 58 while the two clamp halves 42 and 44 are not yet firmly secured together. This enables a guide rail to be inserted or removed from the guide rail clamp 40 without removing clamp half 44 from clamp half 42.

The mechanism by which clamp halves 42 and 44 are secured is best illustrated in FIG. 3. First clamp half 42 contains a first hole 62 through which bolt 50 is inserted. The second clamp half 44 also contains a hole 74 through which the distal end 51 of bolt 50 is inserted. The nut 54 is inserted into the hole 74 in second clamp half 44 to secure bolt 50. Preferably, the sleeved nut 54 is held within second clamp half 44 through an interference fit or by other means, as will be readily understood by those of skill in the art to eliminate the necessity of handling the nut 54 in addition to the second clamp half 44, making assembly of the present invention easily accomplished.

Similarly, clamp half 42 contains a second hole 64 through which bolt 52 is inserted. Second clamp half 44 also contains a hole 76 through which the distal end 53 of bolt 52 is inserted. As described above with regard to nut 54, nut 58 is inserted into hole 76 to secure bolt 52.

In a preferred embodiment, alignment of clamp halves 42 and 44 is further assisted by the use of wedges or pegs 70 and 71 which extend from one half of the clamp into corresponding holes in the other. As illustrated in FIG. 3, pegs 70 and 71 extend out from an inner surface 67 of first clamp half 42. Second clamp half 44 has corresponding holes 72 and 73 in its inner surface 75 to receive pegs 70 and 71. As will be easily understood by those of skill in the art, a single peg and hole may be used or, each clamp half may have one peg and one hole.

Nuts 54 and 58 are preferably hexagonal and have a distally extending cylindrical sleeve 56 and 60, respectively. Both nuts 54 and 58 and cylindrical sleeves 56 and 60 are threaded to accommodate bolts 50 and 52. Threaded sleeves 56 and 60 allow nuts 54 and 58 to catch and secure bolts 50 and 52, respectively, even when the two clamp halves 42 and 44 are spaced apart. This is desirable for easy removal or insertion of a guide rail without disconnecting first and second clamp halves 42 and 44.

Referring to FIG. 3, the outer ends 63, 65 of holes 74 and 76 in the second clamp half 44, located on its outer surface 108, are preferably also hexagonal to accommodate nuts 54 and 58, respectively. As discussed above, nuts 54 and 58 preferably have an interference fit with second clamp half 44 so that nuts 54 and 58 and second clamp half 44 do not move with respect to each other. Therefore, nuts 54 and 58 do not have to be secured or held when bolts 50 and 52 are tightened or loosened. The hexagonal shape of holes 63 and 65 prevent nuts 54 and 58 from turning while bolts 50 and 52 are being tightened or loosened. The outer ends 102, 104 of holes 62 and 64 in first clamp half 42, are preferably circular to accommodate the head of commonly used bolts 50 and 52. Of course, the recesses 63, 65, 102 and 104 are not necessary to perform the present invention.

FIG. 4 illustrates a guide rail clamp 40 securely holding a guide rail 90. Preferably, the outer surfaces of the clamp 40 are sloped or curved to prevent the accumulation of dust and other debris on the clamp 40.

Of course, as described above, other fastening means may be used instead of bolts 50 and 52 and nuts 54 and 58. For example, a screw may be used to removably secure clamp halves 42 and 44.

Figure 5:
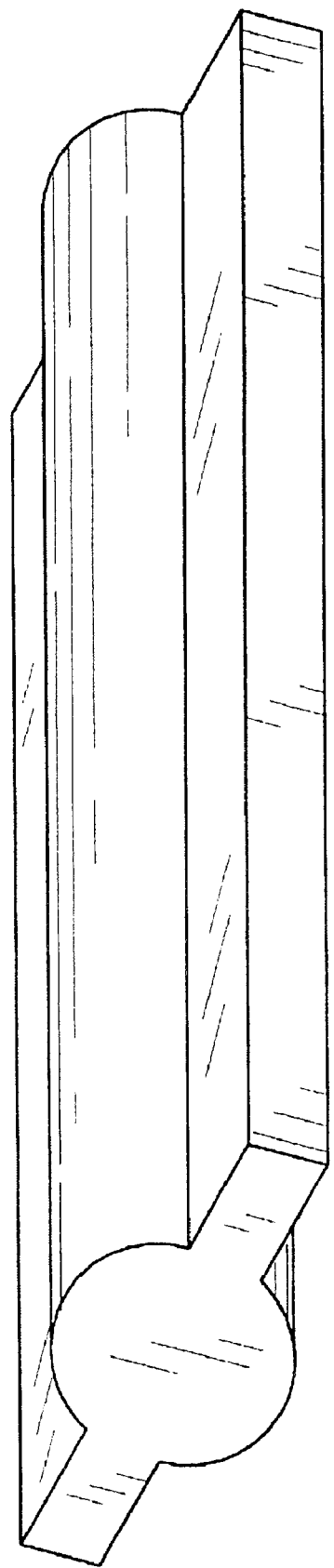
FIG. 5 is a perspective view of an alternatively configured support bar that may be used with the guide rail clamp of the present invention.

Slot 46 extending through clamp halves 42 and 44 is adapted to receive support bars that may be flat, cylindrical, or semi-cylindrical. Intersecting with slot 46 is cylindrical slot section 48 where the diameter of cylindrical slot section 48 is greater than the width of slot 46, but less than the length of slot 46. The novel configuration of slot 46 thus allows a user to be able to adapt clamp 40 of the present invention to receive cylindrical support rods, semi-cylindrical support rods, or flat rectangular support bars in order to support, mount, and position clamp 40 and guide rail 90 with respect to the bar or rod. Alternatively, the support bar may be configured as shown in FIG. 5. Referring to FIG. 4, the clamp 40 is supported by a cylindrical rod 109. As shown in FIGS. 2–4, the slot 46 may be symmetrical when viewed in top plan. However, as will be readily understood by those of skill in the art, the cylindrical slot section 48 may be off center creating a nonsymmetrical slot 46. The cylindrical slot section does not have to be centered with respect to the rectangular slot portion as will be readily understood by one of skill in the art. That is, different slot configurations which can accommodate various shaped support rods are contemplated by the present invention. Referring to FIG. 3, first and second clamp halves 42 and 44 preferably contain grooves 77 and 79 which extend from outer back side 81 of clamp 40 to cylindrical slot section 48. When clamp halves 42 and 44 are fastened together, grooves 77 and 79 join to form a circular bore. Threaded nut 78 is preferably located in a recess 106 in clamp halves 42, 44 when the clamp halves are secured. The threaded nut 78 can not rotate once placed in the recess 106. Preferably the threaded nut 78 is hexagonal or square in shape with a cylindrical bore although other exterior configurations of the nut 78 may easily be utilized. The threaded nut 78 may be secured to either the first or second clamp halves 42, 44 in order to prevent the necessity for inserting the nut 78 upon alignment and securing of the clamp halves 42, 44. Bolt 80 is preferably inserted from outer back side 81 of clamp 40 through threaded nut 78 until distal end 83 of bolt 80 enters slot 46. The purpose of bolt 80 is to securely fasten a support bar or rod to clamp 40 by pressing distal end 83 of bolt 80 against the support bar or rod until the bar or rod is fastened securely against the edges of slot 46. Thus, clamp 40 and guide rail 90 (FIG. 4) are then immobilized against the support bar or rod 109.

Although certain embodiments have been described in detail above, it is intended that the scope of the invention not be limited to the specific embodiments set forth herein. Accordingly, the scope of the invention is intended to be defined only by the claims which follow.

What is claimed is:

1. A guide rail clamp for gripping and supporting a guide rail, comprising:
    a first clamp half having a first slot extending transversely through the first clamp half, the slot having arcuate sections adapted to receive a cylindrical rod and flat sections adapted to receive a rectangular bar;
    a second clamp half removably secured to said first clamp half, said second clamp half having a second slot in alignment with said first slot when said first clamp half is adapted to be secured to said second clamp half;
    a first fastener configured to removably secure said first and second clamp halves; and
    a second fastener adapted to secure said clamp to said bar or rod.

2. The guide rail clamp of claim 1, wherein said first and second clamp halves further comprise a hole extending therethrough for receiving said first fastener.

3. The guide rail clamp of claim 2, wherein said first fastener comprises a bolt and a threaded nut.

4. The guide rail clamp of claim 3, wherein said threaded nut comprises an axial threaded sleeve attached to said nut.

5. The guide rail clamp of claim 2, wherein said first fastener comprises a screw.

6. The guide rail clamp of claim 1, wherein one of said clamp halves comprises at least one peg extending from a first inner surface thereof and said other clamp half comprises at least one hole in a second inner surface thereof to receive said peg.

7. A guide rail clamp comprising:
    a first clamp body having a first clamping edge extending in a longitudinal direction, and a first slot extending transversely through said first clamp body, the first slot comprising concave arcuate sections adapted to receive a support member with a circular cross section, said arcuate sections lying between straight sections adapted to receive a rectangular support member; and
    a second clamp body having a second slot alignable with the first slot, said second body being configured to be secured to said first body to clamp a guide rail.

8. The guide rail clamp of claim 7, wherein the second body comprises a second clamping edge extending in the longitudinal direction, and wherein the second slot extends transversely through said second clamp body and the second slot with substantially the same shape as the first slot.

9. The guide rail clamp of claim 8, wherein the arcuate sections of the first and second clamp bodies are circular arcs having a common central axis.

10. The clamp of claim 9, further comprising a nut sandwiched between the first and second clamp bodies, the nut being adapted to receive a set screw, the set screw having a longitudinal axis extending perpendicular to and intersecting said common central axis of said arcuate sections.

11. The clamp of claim 10, wherein the set screw is adapted to extend at least partially into said first and second slots.

12. The clamp of claim 11, wherein the set screw is adapted to extend into said slot to a plane defined by a pair of straight sections surrounding one of said arcuate sections.

13. The clamp of claim 7, further comprising first and second fasteners extending through the first and second clamp bodies, the fasteners being adapted to secure the first and second clamp bodies to one another.

14. The clamp of claim 13, wherein the fasteners are adapted to clamp a guide rail between the first and second clamping sections.

15. The clamp of claim 7, wherein the first body further comprises at least one pin extending in the transverse direction, and the second body comprises at least one hole adapted to receive said at least one pin.

* * * * *